(12) United States Patent
Dausend

(10) Patent No.: US 8,996,750 B2
(45) Date of Patent: Mar. 31, 2015

(54) AUTOMATION SYSTEM WITH AN OUTPUT DEVICE

(71) Applicant: Stefan Dausend, Schwabach (DE)

(72) Inventor: Stefan Dausend, Schwabach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/925,281

(22) Filed: Jun. 24, 2013

(65) Prior Publication Data

US 2014/0006651 A1    Jan. 2, 2014

(30) Foreign Application Priority Data

Jul. 2, 2012 (EP) .................................... 12174583

(51) Int. Cl.
*G06F 3/00* (2006.01)
*G05B 15/00* (2006.01)
*G06F 13/10* (2006.01)
*G05B 19/042* (2006.01)

(52) U.S. Cl.
CPC ............ *G06F 13/10* (2013.01); *G05B 19/0423* (2013.01)
USPC ............................................... 710/14; 700/1

(58) Field of Classification Search
None
See application file for complete search history.

(56) References Cited

U.S. PATENT DOCUMENTS 7,636,606 B2 * 12/2009 Dold et al. ..................... 700/79
8,630,723 B2 *  1/2014 Prieler et al. .................. 700/19

OTHER PUBLICATIONS

Mirko Funke: "Profinet Innovations 2010", Dec. 31, 2010, pp. 1-8, XP002688117, Nuremberg, Germany Found on the internet: URL:http://www.automation.siemens.com/mcms/automation/en/industrial-communications/profinet/Documents/articles/_assets/innovation/PROFINET_Innovations_EN_F1.pdf [founded on Nov. 27, 2012], pp. 2-3; 2010; DE; Dec. 31, 2010.

* cited by examiner

*Primary Examiner* — Idriss N Alrobaye
*Assistant Examiner* — Richard B Franklin
(74) *Attorney, Agent, or Firm* — Cozen O'Connor

(57) ABSTRACT

An automation system includes a first and second controllers, and an output device connected to the first and second controllers, wherein the output device comprises a module having at least a first submodule and a second submodule, wherein the first controller includes first interconnection information defining an assignment between the first controller and the first submodule, the second controller includes second interconnection information defining an assignment between the second controller and the second submodule, the first submodule accepts first output data from the first controller, the second submodule accepts second output data from the second controller, wherein the module is further configured so that it is connected to a plurality of outputs for control of actuators and includes a logical linkage device for logically linking the first output data to the second output data such that logically linked output data is provided for the outputs for controlling actuators.

7 Claims, 2 Drawing Sheets

AUTOMATION SYSTEM WITH AN OUTPUT DEVICE

BACKGROUND OF THE INVENTION

1. Field of the Invention

The invention relates to an automation system comprising a first controller and a second controller which are connected via a field bus to an output device, where the output device is especially configured to operate with a field bus, in an automation system, for example, in accordance with the Profinet-I/O Standard.

2. Description of the Related Art

In general, automation systems with output devices are preferably employed in process automation to output data to actuators at distributed locations in the process to be automated, wherein this output data is provided by corresponding controllers, such as automation devices designed as a programmable logic controller.

In automation technology, actuators must be able to be controlled in specific applications by different controllers. Previously this problem has been solved by using a local controller. In this case, the different controllers communicate their output data for an actuator to the local controller. There the different output data of the different controllers is evaluated and is passed on to the actuator in accordance with a control specification.

SUMMARY OF THE INVENTION

It is an object of the present invention is to provide an automation system with at least one first controller and a second controller, in which it is possible to control actuators with a mixture of output data from two different controllers without using a preliminary controller.

This and other objects and advantages are achieved in accordance with the invention by an automation system comprising a first controller and a second controller which are connected via a field bus to an output device, where the output device includes a module which in turn features at least a first submodule and a second submodule, where the first controller has first interconnection information that defines an assignment between the first controller and the first submodule and the second controller has second interconnection information that defines an assignment between the second controller and the second submodule, the first submodule is configured to accept first output data from the first controller, the second submodule is configured to accept second output data from the second controller, the module is further configured to be connected to a plurality of outputs for controlling actuators, and where the module has a logical linkage device that is configured to logically link the first output data with the second output data and, through this action, provide logically linked output data for the outputs for controlling the actuators.

If, for example, two controllers are connected to one output device, the device is referred to in automation technology, especially with Profinet-I/O, as a shared device. The output device is accordingly a divided output device which, for different controllers, can accept data, especially output data, for actuators. In modeling in accordance with the Profinet standard, International Electrotechnical Comission (IEC) 61584/IEC 61784 there is provision for the shared devices to be assembled so that the output devices divided into submodules and the submodules are each uniquely assigned a controller. A software application, for example, an executable PLC program of this controller, can only control the submodules assigned to it with output data. The manufacturers do not wish to contravene this standard when building automation devices and input devices but still want to provide an opportunity for a number of controllers in specific process technology applications to be able to control an actuator, such as a motor. As a result, a logical linkage device has been advantageously incorporated into the output device for logically linking first and second output data of different controllers, so that the different controllers can now simultaneously provide output data for a single actuator.

In an advantageous embodiment, the module has an operating mode switching device that is connected to a means having control software of the module, and the control software is configured to interrogate the operating mode switching device and choose between control of the module in a standard mode and a mode in which the first and second output data is logically linked. The operating mode switching device offers the advantage of flexibly employing an output device in an automation system.

To simplify the assignments between the controllers and the submodules, the module has a parameter block in which a device model, comprising the output device, comprises at least the first module which in turn features at least the first submodule and the second submodule, and the first and the second controller with their interconnection information is stored.

The modeling of the device model is used, for example, in the Profinet Standard. The device types controller and I/O device are specified here, where the I/O device corresponds to the output device. The device model for I/O devices thus consists of the objects I/O device, modules and submodules. The Profinet specification makes provision for a submodule with its interfaces to be uniquely assigned to one controller. With the parameter block in the module, the output device continues to be parameterized in accordance with the Profinet specification with the unique assignment of a submodule to a controller, but the logical linkage device now allows it to logically link output data of different controllers and to provide new, logically linked output data for actuators, through which the option is created of controlling an actuator from different controllers.

In a further embodiment of the automation system, the module has a diagnostic device for the logically linked output data and the diagnostic device is configured to evaluate the signal state of an output signal of the logically linked output data and to assign a status to the output signal and to couple the status back to the first submodule.

This diagnostic information is advantageously provided to the controllers as additional information alongside possible output status data. The status information and the output status data and the diagnostic information are checked in the controllers and safety measures can be derived from this status data.

In a further embodiment, the module is expanded and configured so as to pass on the status of the logically linked output data to the second submodule.

Furthermore, the module is configured so as to couple back the first output data as first output status data and the second output data as second output status data to the first submodule and to the second submodule.

In a further embodiment, the input device has a backplane bus into which a number of modules can be plugged.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment, in which.

DETAILED DESCRIPTION OF THE PREFERRED EMBODIMENTS

Figure 1:
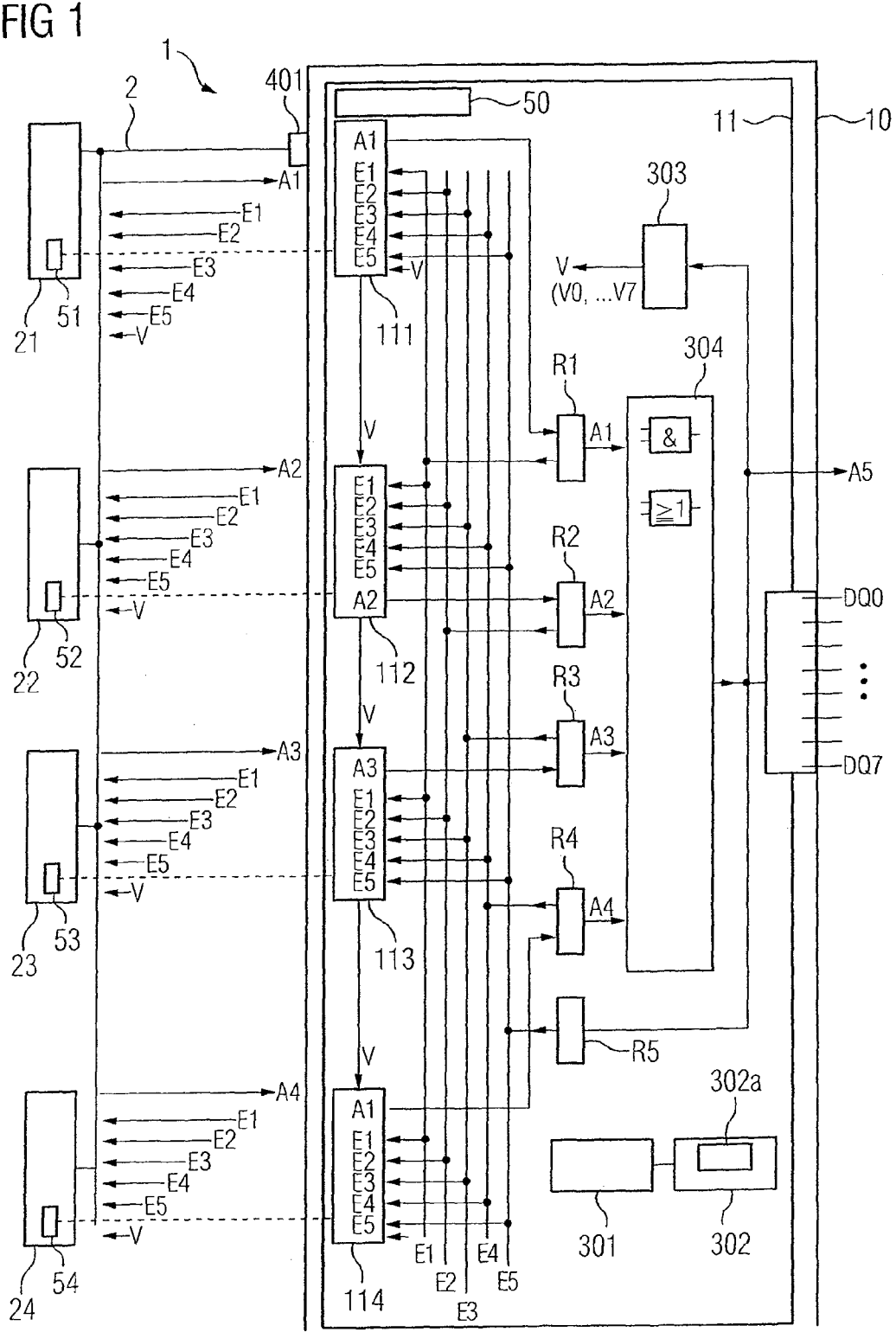
FIG. 1 shows an automation system with a number of controllers and an output device in accordance with the invention.

In accordance with FIG. 1 an automation system 1 is shown, comprising a first controller 21, a second controller 22, a third controller 23 and a fourth controller 24, which can jointly access an output device 10 via a field bus 2.

In order to coordinate the accesses or the controllers, the first controller 21 has first interconnection information 51, where the access of the first controller 21 by the field bus 2 to a first submodule 111 of a module 11 of the output device 10 is indicated symbolically via a dashed line. The second third and fourth controllers 22, 23, 24 also have second, third and fourth interconnection information 52, 53, 54. These access or control paths are also indicated symbolically via dashed lines to the output device 10. Accordingly, the first controller 21 is assigned to the first submodule 111, the second controller 22 to a second submodule 112, the third controller 23 to a third submodules 113 and the fourth controller 24 to a fourth submodule 114.

The output device 10 is connected to a plurality of outputs DQ0, ..., DQ7 for the output of process signals to actuators which might possibly be connected (not shown).

In the exemplary embodiment in accordance with FIG. 1, the output device 10 only features a first module 11. Actuators from the process to be automated are connected to the module 11 via signal lines.

A separate control program executes in each of the controllers 21, ..., 24. Accordingly, a first control program provides first output data A1 in the first controller 21, a second control program provides second output data A2 in the second controller 22, a third control program provides third output data A3 in the third controller 23 and a fourth control program provides fourth output data A4 in the fourth controller 24. The output data A1, ..., A4 is sent via the field bus 2 via a field bus interface 401 to the output device 10. The first output data A1 is intended to the first submodule 111, the second output data A2 is intended for the second submodule 112, the third output data A3 is intended for the third submodule 113 and the fourth output data A4 is intended for the fourth submodule 114.

The output data A1, ..., A4 is conveyed via internal signal lines in the module 11 to a logical linkage device 304. "AND" and/or "OR" gates in accordance with Boolean algebra (logic) are implemented, for example, in the logical linkage device 304. The corresponding output data A1, ..., A4 is logically linked in the logical linkage device 304 and the logical linkage result is provided as fifth output data A5 to a physical output driver of the output device 10 and through this a respective actuator can be controlled by the outputs DQ0, ..., DQ7.

Coupling-back devices R1, ..., R5 are arranged between the submodules 111, ..., 114 and the logical linkage device 304. The first coupling-back device R1 is configured to accept the first output data A1 of the first submodule 111 and, on the one hand, to forward the first output data A1 to the logical linkage device 304 and, on the other hand, to forward or couple back the first output data as first output status data E1 to the second submodule 112, the third submodule 113 and the fourth submodule 114. Similarly to the first coupling-back device R1 a second coupling-back device R2 exists for the second output data A2 of the second submodule 112, a third coupling-back device R3 for the third output data A3 of the third submodule 113 and a fourth coupling-back device R4 for the fourth output data A4 of the fourth submodule 114.

It is of importance for secure process management to also know an output status of the logically linked output data A5. As a result, a fifth coupling-back device R5 is provided, which likewise couples back fifth output status data E5 to all submodules 111, ..., 114.

To improve a diagnostic option, the module 11 has a diagnostic device 303 which is configured to evaluate the signal state of a respective output signal of the logically linked output data A5 and to assign the output signal 10 a status V0, ..., V7 and to forward this status V0, ..., V7 to the first submodule 111.

The status V0, ..., V7, for example, 8 bits of a status byte, is now referred to generally as status data V. This status data V is present via an input signal line at the first submodule 111. The first submodule 111 passes on the status data V to the second submodule 112, the second submodule 112 passes on the status data V to the third submodule 113 and the third submodule 113 passes on the status data V to the fourth submodule 114.

Here, all submodules 111, ..., 114 now have all output data A1, ..., A5, all output status data E1, ..., E5 and all status data V available to them. As a result, the submodules 111, ..., 114 can also pass on this collected status data via the field bus 2 to the corresponding controllers 21, ..., 24 for evaluation and diagnostic purposes.

In order to switch from a standard mode into a mode in which logically linked output data is provided, the module has an operating mode switching device 301, which is connected to a device 302 featuring control software 302a. The control software 302a is configured such that the operating mode switching device 301 is to be interrogated and to switch between control of the module 11 by the control software 302a in a standard mode or into an output data logical linkage mode.

Figure 2:
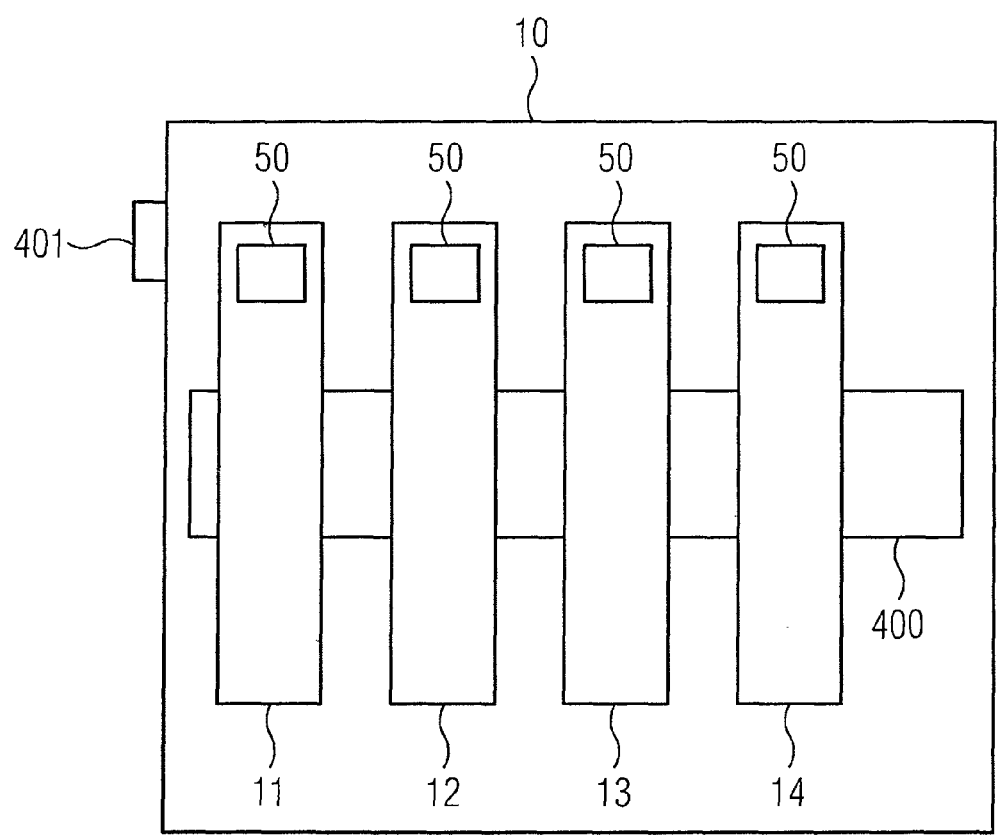
FIG. 2 shows an output device with a number of modules in accordance with the invention.

FIG. 2 shows an expanded output device 10. The output device 10 is expanded so that, in addition to the first module 11, it can accept a second module 12, a third module 13 and a fourth module 14 via a built-in backplane bus 400. All modules 11, 12, 13, 14 each have a parameter block 50 in which the interconnection information for the different controllers is stored. The internal structure of the modules 11, 12, 13, 14 corresponds to the structure of the first module 11 depicted in FIG. 1. The output device 10 has a field bus terminal 401 to which the field bus 2 is connected.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An automation system, comprising:
    a first controller;
    a second controller; and
    an output device connected via a field bus to the first and second controllers, the output device comprising a module including at least a first submodule, a second submodule and an operating mode switching device connected to a means including control software of the module, and the control software is configured to interrogate the operating mode switching device and to choose between a control of the module in one of a standard operating mode and an operating mode in which first and second output data are logically linked;
    wherein the first controller includes first interconnection information which defines an assignment between the first controller and the first submodule, and the second controller has second interconnection information, which defines an assignment between the second controller and the second submodule;
    wherein the first submodule is configured to accept the first output data from the first controller; and
    wherein the second submodule is configured to the accept second output data from the second controller; and
    wherein the module is further configured so as to link to a plurality of outputs for control of actuators, the module further including a logical linkage device configured to logically link the first output data with the second output data such that logically-linked output data is provided for the outputs to control the actuators.

2. The automation system as claimed in claim 1, wherein the module includes a parameter block in which a device model comprising the output device, at least the first module having at least the first submodule and the second submodule, and the first and second controller with their interconnection information is stored.

3. The automation system as claimed in claim 2, wherein the device model is parameterized in accordance with the Profinet specification.

4. The automation system as claimed in claim 1, wherein the module includes a diagnostic device for the logically linked output data and the diagnostic device is configured to evaluate a signal state of an output signal of the logically linked output data and to assign the output signal a status and to couple back the status to the first submodule.

5. The automation system as claimed in claim 4, wherein the module is further configured to pass on the status of the logically-linked output data to the second submodule.

6. The automation system as claimed in claim 1, wherein the module is configured to couple-back the first output data as first output status data and couple-back the second output data as second output status data to the first submodule and to the second submodule.

7. The automation system as claimed in claim 1, wherein the output device includes a backplane bus into which a plurality of modules are pluggable.

* * * * *